(12) United States Patent
Lee et al.

(10) Patent No.: US 10,320,542 B2
(45) Date of Patent: Jun. 11, 2019

(54) METHOD AND DEVICE FOR TRANSMITTING CONTROL INFORMATION TO BE USED IN TERMINAL

(71) Applicant: LG ELECTRONICS INC., Seoul (KR)

(72) Inventors: Sangrim Lee, Seoul (KR); Hojae Lee, Seoul (KR); Hyunsoo Ko, Seoul (KR); Kwangseok Noh, Seoul (KR); Dongkyu Kim, Seoul (KR)

(73) Assignee: LG Electronics Inc., Seoul (KR)

(*) Notice: Subject to any disclaimer, the term of this patent is extended or adjusted under 35 U.S.C. 154(b) by 19 days.

(21) Appl. No.: 15/573,072

(22) PCT Filed: Oct. 30, 2015

(86) PCT No.: PCT/KR2015/011532
§ 371 (c)(1),
(2) Date: Nov. 9, 2017

(87) PCT Pub. No.: WO2016/204353
PCT Pub. Date: Dec. 22, 2016

(65) Prior Publication Data
US 2018/0139022 A1    May 17, 2018

Related U.S. Application Data

(60) Provisional application No. 62/181,219, filed on Jun. 18, 2015.

(51) Int. Cl.
*H04L 5/00* (2006.01)
*H04L 25/03* (2006.01)
(Continued)

(52) U.S. Cl.
CPC ...... *H04L 5/0048* (2013.01); *H04L 25/03019* (2013.01); *H04L 27/264* (2013.01);
(Continued)

(58) Field of Classification Search
CPC ... H04L 5/0005; H04L 5/0048; H04L 5/0051; H04L 25/03019; H04L 27/2607;
(Continued)

(56) References Cited

U.S. PATENT DOCUMENTS 6,657,950 B1 * 12/2003 Jones, IV .......... H04L 25/03038
370/208
9,419,770 B2 * 8/2016 Abdoli .................. H04L 5/0066
(Continued)

FOREIGN PATENT DOCUMENTS

WO    2010050731    5/2010

*Primary Examiner* — Asad M Nawaz
*Assistant Examiner* — Thomas R Cairns
(74) *Attorney, Agent, or Firm* — Dentons US LLP

(57) ABSTRACT

A method and a device for transmitting control information to be used in a terminal are provided. Specifically, an asynchronous level of a terminal supporting an asynchronous transmission mode is measured by using a signal received from the terminal. It is determined whether a measured value of the asynchronous level exceeds a threshold value, and if the asynchronous level is exceeded, a filter length and a CP length, which are to be used in the terminal, are changed. Information on the changed filter length and CP length is transmitted to the terminal. A sum of the filter length and the CP length is fixed, a characteristic of out-of-band emission improves when the filter becomes long in length, and interference occurring due to a multi-path delay can be prevented when the CP length becomes long.

11 Claims, 16 Drawing Sheets

(51) Int. Cl.
*H04W 56/00* (2009.01)
*H04W 72/04* (2009.01)
*H04W 72/08* (2009.01)
*H04L 27/26* (2006.01)
*H04W 4/70* (2018.01)

(52) U.S. Cl.
CPC ....... *H04L 27/2646* (2013.01); *H04W 56/001* (2013.01); *H04W 72/042* (2013.01); *H04W 72/0446* (2013.01); *H04W 72/082* (2013.01); *H04L 5/0005* (2013.01); *H04L 5/0051* (2013.01); *H04L 27/2607* (2013.01); *H04W 4/70* (2018.02); *H04W 72/0453* (2013.01)

(58) Field of Classification Search
CPC .... H04L 27/264; H04L 27/2646; H04W 4/70; H04W 56/001; H04W 72/042; H04W 72/0446; H04W 72/0453; H04W 72/08; H04W 72/082; H04W 72/085
See application file for complete search history.

(56) References Cited

U.S. PATENT DOCUMENTS

| | | |
|---|---|---|
| 10,003,480 B2 * | 6/2018 | Soriaga ............. H04L 25/03834 |
| 2006/0087961 A1 | 4/2006 | Chang et al. |
| 2010/0157957 A1 | 6/2010 | Yang et al. |
| 2013/0163501 A1 | 6/2013 | Chen et al. |
| 2013/0215852 A1 | 8/2013 | Noh et al. |
| 2016/0192353 A1 * | 6/2016 | Abdoli ................. H04L 27/264 370/336 |
| 2016/0204822 A1 * | 7/2016 | Yu ........................... H04B 1/40 375/219 |

* cited by examiner

METHOD AND DEVICE FOR TRANSMITTING CONTROL INFORMATION TO BE USED IN TERMINAL

CROSS-REFERENCE TO RELATED APPLICATIONS

This application is the National Stage filing under 35 U.S.C. 371 of International Application No. PCT/KR2015/011532, filed on Oct. 30, 2015, which claims the benefit of U.S. Provisional Application No. 62/181,219 filed on Jun. 18, 2015, the contents of which are all hereby incorporated by reference herein in their entirety.

BACKGROUND OF THE INVENTION

Field of the Invention

This specification relates to wireless communication and, most particularly, to a method and device for transmitting control information that is used in a terminal (or user equipment) in a wireless communication system.

Related Art

The next generation multimedia wireless communication system, which has recently been very actively and extensively researched and developed, is being request to be evolved as a system that can process and transmit diverse information, such as images, wireless data (or radio data), and so on, excelling the initial voice-based services. For example, hologram and real-time UHD high picture quality services, which can provide higher transmission rates by using a larger amount of frequency resource as compared to the conventional wideband services. Additionally, mission critical services requesting low latency, emergency services or tactical internet service requesting ultimately low latency, and services such as V2X are being requested. Furthermore, massive machine communication, sensor networks, and so on, for supporting a massive number of devices are also be requested.

The purpose of such next generation wireless communication system is to allow reliable communication to be carried out regardless of the position and mobility of multiple users. However, the wireless channel has non-ideal characteristics, such as path loss, noise, fading caused by a multi-path, Inter Symbol Interference (ISI), or a Doppler effect caused by the mobility of the device. A wide range of technology is being researched and developed in order to overcome such non-ideal characteristics of the wireless channel and to enhance reliability in wireless communication.

It is difficult to provide the above-described services by using the Cyclic Prefix-OFDM (CP-OFDM) scheme of the conventional (or legacy) LTE system. Most particularly, by using the conventional LTE system, it is difficult to satisfy the request for low latency communication by using a TTI having the length of 1 ms. Accordingly, new types of waveforms that can satisfy such request are emerging. For example, new waveforms, such as Filter Bank Multi Carrier (FBMC), Generalized Frequency Division Multiplexing (GFDM), Universal Filtered-OFDM (UF-OFMD), FCP-OFDM (Filtered CP-OFDM), and so on, are being discussed as the adequate waveforms for the next generation wireless communication system services. Among such new waveforms, a next generation communication system that demonstrates robustness in asynchronous reception by adaptively adjusting a filter length and a CP duration will hereinafter be described in detail.

SUMMARY OF THE INVENTION

Technical Objects

An object of the present invention is to provide a method and device for transmitting control information that is used in a terminal (or user equipment) in a wireless communication system.

Technical Solutions

This specification proposes a method for transmitting, by a base station, control information used in a user equipment (or terminal).

An asynchronous level of a user equipment supporting an asynchronous transmission mode by using a signal received from the user equipment is measured. The base station analyzes a timing difference based on a reception signal that has reached the base station from the user equipment and, then, measures the asynchronous level. The asynchronous level is also referred to as a degree of asynchronicity. Since the user equipment supports the asynchronous transmission mode, the user equipment performs random access to the base station instead of receiving timing advance (TA) information being related to its time-based synchronization with the base station. The TA information is determined based on a delay length (or level of latency) of the signal received from the user equipment. The signal received from the user equipment may be received through a Physical Random Access Channel (PRACH) or a Sounding Reference Signal (SRS).

Whether or not the measured value of the asynchronous level exceeds a threshold value is determined. The measured value of the asynchronous level becomes a maximum difference value between reception points of signals received from the user equipment. The threshold value may be pre-determined by the base station.

In case the measured value of the asynchronous level exceeds the threshold value, a filter length and a cyclic prefix (CP) length being used by the user equipment are varied (or changed). Since a sum of the filter length and the CP duration always corresponds to a fixed value, the filter length and the CP duration forms a relationship, wherein, when the filter length increases, the CP duration decreases, and wherein, when the filter length decreases, the CP duration increases. As the filter length becomes longer in the time domain, a wider range of areas may be controlled (or adjusted) by the filter in the frequency domain. Thus, a level of enhancement in the characteristic of out-of-band (OOB) emission in the frequency domain also increases. The CP duration is shorter than a length of OFDM symbol or an SC-FDMA symbol. The CP having the corresponding CP duration is positioned in-between the OFDM symbols or the SC-FDMA symbols, thereby performing a function of preventing interference from occurring due to a delay caused by a multi-path.

Conversely, in case the measured value of the asynchronous level does not exceed the threshold value, the filter length and the CP duration being used by the user equipment are maintained without modification. More specifically, while the information on the previous filter is maintained, the CP duration is also maintained.

In case the measured value of the asynchronous level exceeds the threshold value, information on the varied filter length and CP duration is transmitted to the user equipment. The information on the varied filter length and CP duration is transmitted to the user equipment through a PBCH, a physical layer signal, or a higher layer signal. The user equipment applies the varied filter length and CP duration and performs data transmission.

Additionally, this specification proposes a wireless device transmitting control information used in a user equipment.

The wireless device includes a RF and a processor being operatively connected to the RF unit. The processor is configured to measure an asynchronous level of a user equipment supporting an asynchronous transmission mode by using a signal received from the user equipment, to determine whether or not the measured value of the asynchronous level exceeds a threshold value, in case the measured value of the asynchronous level exceeds the threshold value, to vary a filter length and a cyclic prefix (CP) length being used by the user equipment, and to transmit information on the varied filter length and CP duration to the user equipment.

Effects of the Invention

Receiving performance in an asynchronous situation is expected to be enhanced. Also, by enabling asynchronous reception to be performed, data transmission may be performed without having to carry out a RACH procedure performing Timing Advance (TA) in the legacy LTE system. This may be considered as one of the basic techniques capable of reducing overhead in the legacy (or conventional) synchronization procedure. And, this results in a large gain in energy efficiency when performing communication, such as Machine Type Communication (MTC), wherein energy efficiency is an important factor.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink.

For clarity of explanation, the following description will focus on the 3GPP LTE. However, technical features of the present invention are not limited thereto.

Figure 1:
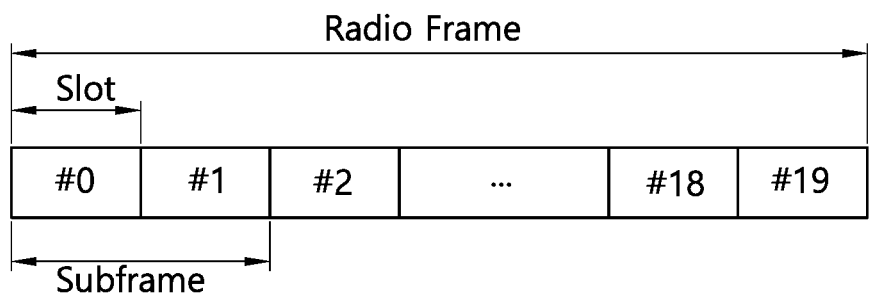
FIG. 1 shows a structure of a radio frame in 3GPP LTE.

FIG. 1 shows a structure of a radio frame in 3GPP LTE.

Referring to FIG. 1, the radio frame consists of 10 subframes. One subframe consists of 2 slots. The slots in the radio frame are numbered from slot number 0 to 19. A time required for transmitting one subframe is defined as a transmission time interval (TTI). The TTI is a unit of scheduling for transmitting a data. For example, one subframe may have a length of 1 millisecond (ms), and one slot may have a length of 0.5 ms.

The structure of the radio frame is for exemplary purposes only, and the number of subframes included in the radio frame or the number of slots included in the subframe and the number of SC-FDMA symbols included in the slot can change variously.

Figure 2:
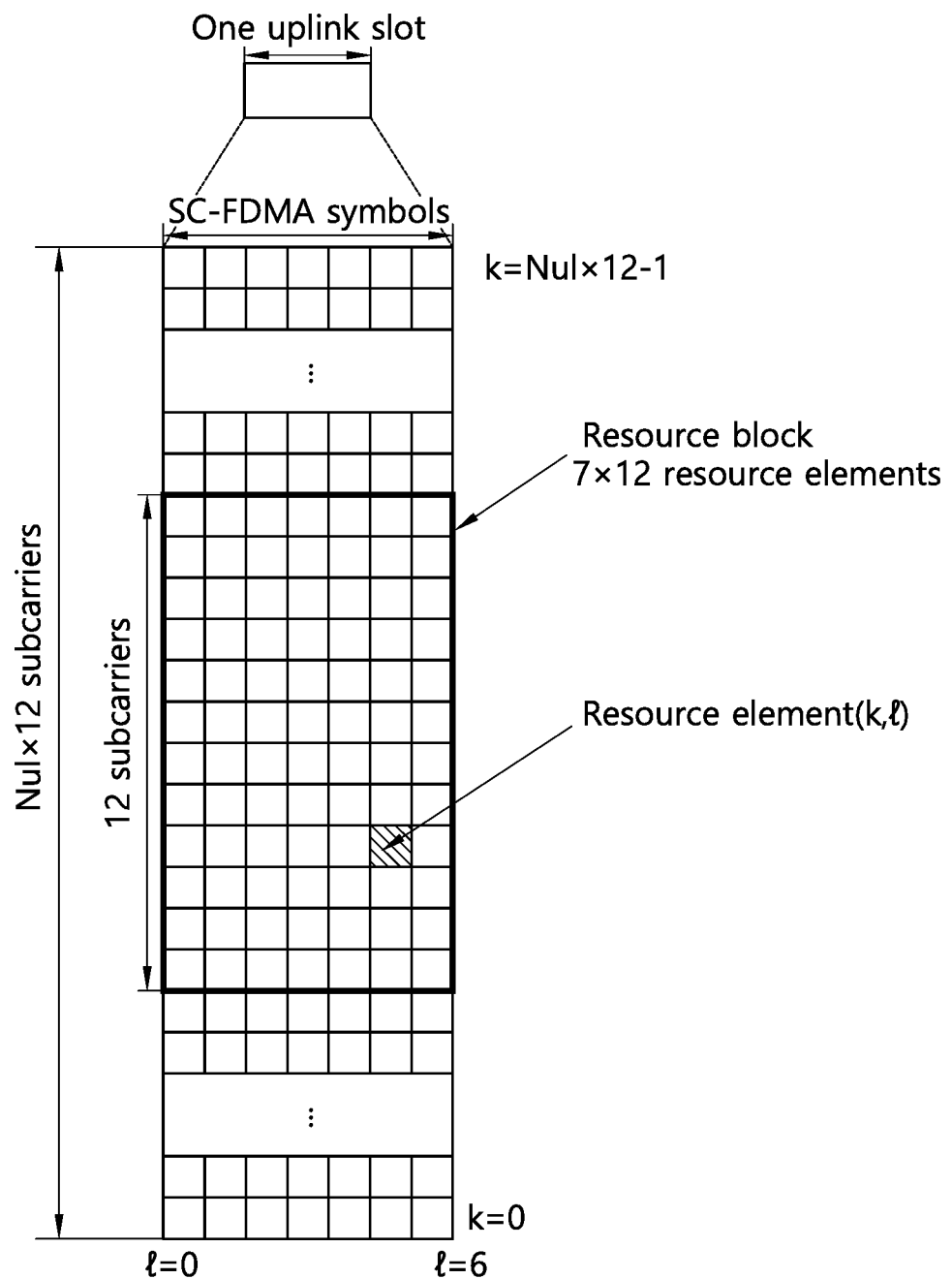
FIG. 2 is a diagram showing an example of a resource grid for one uplink slot in 3GPP LTE.

FIG. 2 is a diagram showing an example of a resource grid for one uplink slot in 3GPP LTE.

Referring to FIG. 2, the UL slot includes a plurality of SC-FDMA symbols in a time domain and includes a plurality of $N^{UL}$ RBs in a frequency domain. It is described that the SC-FDMA symbols are for representing one symbol period, and the SC-FDMA symbols can be OFDM symbols or symbol period according to the system. The RBs are a unit of resource allocation in the frequency domain and include 12 subcarriers. The number $N^{UL}$ of RBs included in the UL slot depends on a UL bandwidth defined in a cell. The UL bandwidth is system information. The UE may know $N^{UL}$ by acquiring the system information.

Each element on the resource grid is referred to as a resource element. One RB includes 12×7 resource elements. The resource element on the resource grid can be identified by an index pair (k, l) within the slot. Herein, k (k=0, . . . , $N^{UL}$×12−1) denotes a subcarrier index in the frequency domain, and l(l=0, . . . , 6) denotes an SC-FDMA symbol index in the time domain.

Although it is described herein that one RB includes 7×12 resource elements consisting of 7 SC-FDMA symbols in the time domain and 12 subcarriers in the frequency domain for example, the number of SC-FDMA symbols and the number of subcarriers in the RB are not limited thereto. Thus, the number of subcarriers or the number of SC-FDMA symbols included in the RB may change variously. The number of SC-FDMA symbols may change depending on a cyclic prefix (CP) length. For example, when using a normal CP, the number of SC-FDMA symbols included in one slot is 7, and when using an extended CP, the number of SC-FDMA symbols included in one slot is 6.

In 3GPP LTE of FIG. 2, a resource grid for a single uplink slot may also be applied to a resource grid for a downlink slot. In this case, the downlink slot includes a plurality of orthogonal frequency division multiplexing (OFDM) symbols in a time domain.

Figure 3:
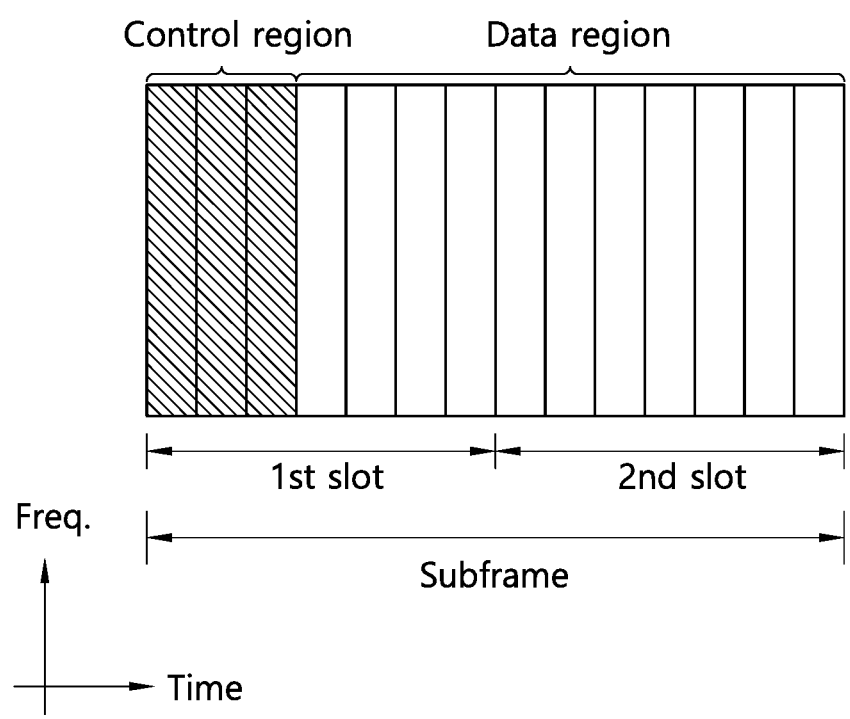
FIG. 3 shows an example of a structure of a downlink subframe in 3GPP LTE.

FIG. 3 shows an example of a structure of a downlink subframe in 3GPP LTE.

Referring to FIG. 3, a downlink subframe includes two contiguous slots. In the first slot of the downlink subframe, a maximum of the former three OFDM symbols become a control region to which a physical downlink control channel (PDCCH) is allocated, and the remaining OFDM symbols become a data region to which physical downlink shared channels (PDSCHs) are allocated. Control channels, such as a physical control format indicator channel (PCFICH) and a physical hybrid-ARQ indicator channel (PHICH), in addition to a PDCCH may be allocated to the control region. In this case, the inclusion of the three OFDM symbols in the control region is only an example. The number of OFDM symbols included in the control region of a subframe may be aware through a PCFICH. A PHICH carries hybrid automatic repeat request (HARQ) acknowledgement (ACK)/not-acknowledgement (NACK) information as a response to uplink data transmission.

A PDCCH may carry a downlink grant that provides notification of the resource allocation of downlink transmission on a PDSCH. UE may read downlink user data transmitted through a PDSCH by decoding control information transmitted through the PDCCH. Furthermore, the PDCCH may carry control information, used for physical uplink shared channel (PUSCH) scheduling, to the UE. The control information used for PUSCH scheduling is an uplink grant that provides notification of the resource allocation of uplink transmission.

A control region consists of an aggregation of a plurality of control channel elements (CCEs). A PDCCH is transmitted on an aggregation of one or some contiguous CCEs. A CCE corresponds to a plurality of resource element groups. A resource element group is used to define the mapping of a control channel to a resource element. In a downlink subframe, if a total number of CCEs is $N_{cce}$, CCE indices of 0 to $N_{cce}$,k−1 are assigned to CCEs. A total number of CCEs within a subframe may also be different in each subframe because the number of OFDM symbols included in a control region within a subframe may be different in each subframe.

Figure 4:
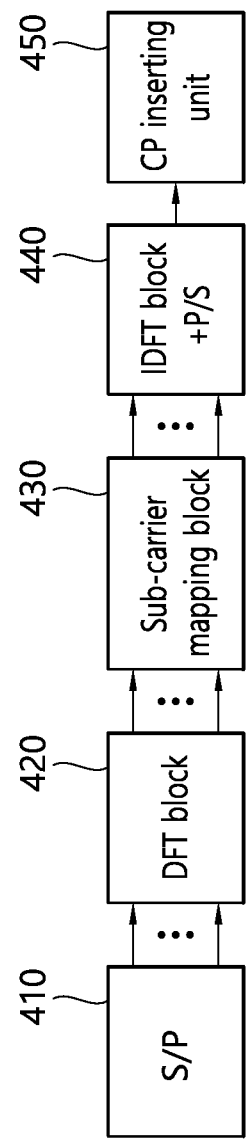
FIG. 4 is a block view illustrating a transmitting end of a legacy OFDM.

FIG. 4 is a block view illustrating a transmitting end of a legacy OFDM.

The legacy OFDM may correspond to a CP-OFDM, wherein a CP is inserted in an OFDM signal in order to resolve the problem of inter-symbol interference within one sub-carrier occurring due to a time-based spreading of the signal.

A transmitting end of the legacy OFDM system includes a S-to-P (S/P) block 410, a DFT block 420, a sub-carrier mapping block 430, an IDFT block and P-to-S (P/S) block 440, and a CP inserting unit 450. Also, the transmitting end of the legacy OFDM system may further include a channel coding unit (not shown) and a modulator (not shown).

The channel coding unit generates coded bits by performing channel coding on information bits. The information bits may be referred to as data being transmitted from the transmitting end. The modulator generates modulated symbols by mapping encoded bits to symbols indicating (or expressing) positions within a signal constellation. Although there is no limitation in the modulation scheme, the modulation scheme may correspond to m-Phase Shift Keying (m-PSK) or m-Quadrature Amplitude Modulation (m-QAM). The modulated symbols are processed with serial-to-parallel conversion by the S-to-P block 410 and may then be inputted to the DFT block 420.

The DFT block 420 performs DFT on the inputted symbols and outputs complex-valued symbols. For example, when N number of symbols are inputted, a DFT size may be equal to N (wherein N is an integer).

The sub-carrier mapping block 430 may also be referred to as a frequency domain data processing block because it maps complex-valued symbols to each sub-carrier. The complex-valued symbols may be mapped to resource elements that are allocated data transmission.

The IDFT block 440 performs IFFT on the inputted symbols and outputs a baseband signal for data corresponding to a time domain signal. Herein, when the given IFFT size is equal to M, the value M may be determined based on a channel bandwidth (wherein M is an integer). In case the DFT size N is equal to the IDFT size N, since the consecutive calculation of the DFT and the IDFT corresponds to an inverse function between the DFT and the IDFT, one may completely cancel the other. However, in case M exceeds N, 0's may be inserted to the remaining exceeding inputs within the IDFT block.

Being included in the IDFT block 440, the P-to-S (P/S) block 440 may perform parallel-to-serial conversion on the baseband signal being outputted from the IDFT block, and the CP inserting unit 450 copies an end part of the baseband signal for the data and inserts the copied end part in front of the baseband signal for data. Since Inter Symbol Interference (ISI) and Inter Carrier Interference (ICI) are prevented due to the CP insertion, orthogonality may also be maintained in the multi-path channel.

As described above, a transmission scheme, wherein IDFT is performed after a DFT spread, is referred to as SC-FDMA. More specifically, in an uplink, the transmitting end performs both DFT and IDFT. The SC-FDMA may also be referred to as a DFT spread-OFDM (DFTS-OFMD). In the SC-FDMA, peak-to-average power ratio (PAPR) or a cubic metric (CM) may be reduced. In case of using the SC-FDMA transmission scheme, transmission power efficiency may be increased in a device having limited power consumption. Accordingly, a user throughput may also be increased.

Figure 5:
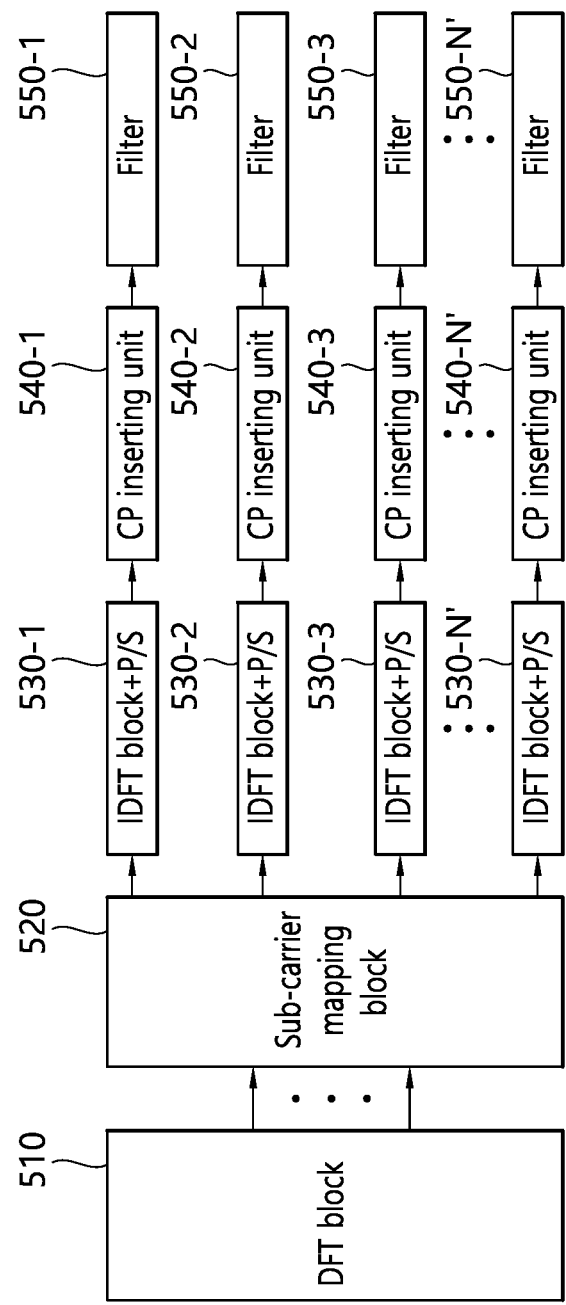
FIG. 5 is block view illustrating a transmitting end of an FCP-OFDM.

FIG. 5 is block view illustrating a transmitting end of an FCP-OFDM.

Unlike the legacy OFDM system, which includes only one IDFT block, the FCP-OFDM system includes a plurality of IDFT blocks, and the UF-OFDM system is also configured to have a structure, wherein each of a plurality of filters is in a one-to-one correspondence with the plurality of IDFT blocks. The filter may correspond to a band pass filter. Each set of the plurality of IDFT blocks and the plurality of filters may be applied to each sub-band in sub-band units. As described above, by adopting filters in sub-band units, the FCP-OFDM system may largely reduce the influence caused to another adjacent (or neighboring) band as compared to the legacy OFDM system. Such characteristic has a large gain in the aspect of using a fragmented spectrum in a situation where the current frequency resource is exhausted. Additionally, this characteristic also acts a base structure for the next generation technology communication. More specifically, the structure and operation procedures of a transmitting end included in the FCP-OFDM system will hereinafter be described in detail.

The transmitting end of the UF-OFDM system includes a S-to-P (S/P) block (not shown), a DFT block 510, a sub-carrier mapping block 520, a plurality of IDFT blocks and P-to-S (P/S) blocks 530-1, 530-2, . . . , 530-N', a plurality of CP inserting units 540-1, 540-2, . . . , 540-N', and a plurality of filters 550-1, 550-2, . . . , 550-N'. Also, the transmitting end of the FCP-OFDM system may further include a channel coding unit (not shown) and a modulator (not shown).

Just as in the transmitting end of the legacy OFDM system, the channel coding unit generates coded bits by performing channel coding on information bits. The information bits may be referred to as data being transmitted from the transmitting end. The modulator generates modulated symbols by mapping encoded bits to symbols indicating (or expressing) positions within a signal constellation. Although there is no limitation in the modulation scheme, the modulation scheme may correspond to m-Phase Shift Keying (m-PSK) or m-Quadrature Amplitude Modulation (m-QAM). The modulated symbols are processed with serial-to-parallel conversion by the S-to-P block and may then be inputted to the DFT block 510.

The DFT block 510 performs DFT on the inputted symbols and outputs complex-valued symbols. For example, when N number of symbols are inputted, a DFT size may be equal to N (wherein N is an integer).

The sub-carrier mapping block 520 may also be referred to as a frequency domain data processing block because it spreads out the outputted complex-valued symbols in the frequency domain and then maps the spread symbols to the sub-carriers. The sub-carrier mapping block maps the complex-valued symbols to the sub-carriers and outputs N' number of sub-bands (wherein N' is an integer). Herein, the N' number of sub-bands may be indicated as sub-band #1, sub-band #2, . . . , sub-band # N'. A Null may be inserted between each two consecutive sub-bands. The complex-valued symbols within one sub-band may be mapped to consecutive sub-bands within the frequency domain. More specifically, a concentrated mapping method may be used in one sub-band. Accordingly, the signal that is mapped as described above may correspond to the sub-band.

The plurality of IDFT blocks 530-1, 530-2, . . . , 530-N' may perform IFFT for each sub-band among the N' number of sub-bands and may transmit a baseband signal for data corresponding to a time domain signal. More specifically, an $n^{th}$ IDFT block 530-n may perform IFFT to sub-block #n and may then output an $n^{th}$ baseband signal (wherein n=1, 2, . . . , N'). Herein, when the given IFFT size is equal to M, the value M may be determined based on a channel bandwidth (wherein M is an integer). In case the DFT size N is equal to the IDFT size N, since the consecutive calculation of the DFT and the IDFT corresponds to an inverse function between the DFT and the IDFT, one may completely cancel the other. However, in case M exceeds N, 0's may be inserted to the remaining exceeding inputs within each of the IDFT blocks 530-1, 530-2, . . . , 530-N'.

The P-to-S block is included in each of the plurality of IDFT blocks 530-1, 530-2, . . . , 530-N' and may perform parallel to serial conversion on a baseband signal being outputted from each IDFT block. The CP inserting unit 540-1, 540-2, . . . , 540-N' copies an end portion of the baseband signal for the data and inserts the copied portion in front of the baseband signal for the data. By performing CP insertion, Inter Symbol Interference (ISI) and Inter Carrier Interference (ICI) may be prevented, thereby allowing orthogonality to be maintained even in a multi-path channel.

A plurality of filters 550-1, 550-2, . . . , 550-N' may be in a one-to-one correspondence with the plurality of IDFT blocks 530-1, 530-2, . . . , 530-N' and may filter the baseband signal being outputted from the corresponding IDFT block and having a CP inserted therein. More specifically, the $n^{th}$ filter filters a baseband signal, which is outputted from the $n^{th}$ IDFT block (wherein n=1, 2, . . . , N') and having a CP inserted therein. Accordingly, it will be apparent that the filter is applied in sub-band units in the FCP-OFDM system. Herein, the length of each filter may be given as L.

Figure 6:
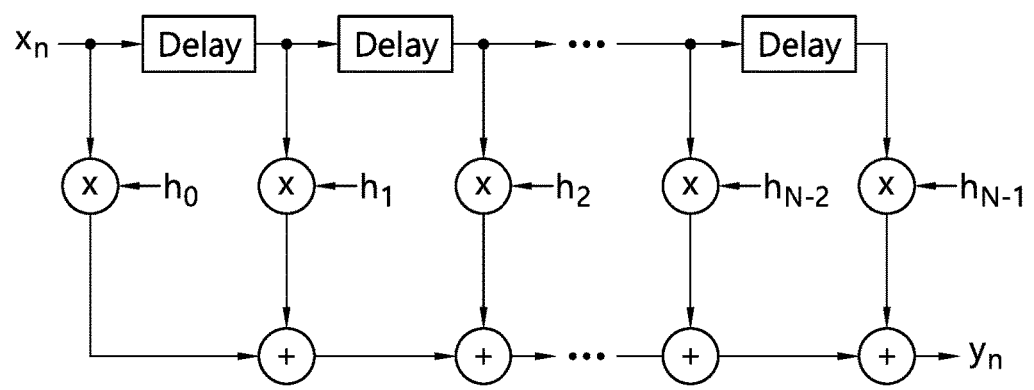
FIG. 6 is a diagram showing a logical structure of a FIR filter.

FIG. 6 is a diagram showing a logical structure of a FIR filter.

In this specification, the filter that is being mentioned herein corresponds to a Finite Impulse Response (FIR). As a type of digital filter, the FIR filter performs a convolution sum by multiplying a consistent coefficient by finite samples (N number of samples) among input signal sequences. Operations of the FIR filter may be indicated as shown below in Equation 1.

$$y[n] = \sum_{k=0}^{N-1} h[k]x[n-k] \quad \text{[Equation 1]}$$

(wherein, degree: $N - 1$, and length: $N$)

Referring to FIG. 6 and Equation 1, a length of the FIR filter is equal to N. This is a value corresponding to length L of the filter, which is used in this specification. The length L of the filter may also be referred to as a number of taps of the filter. More specifically, a filter length N corresponds to a filter length L, which is used by the user equipment, or a number of taps of the filter. A h[k] value corresponds to a coefficient that is used for multiplication, and this value allows an output at time n to be equal to a sum of all delayed sampled being multiplied by an adequate coefficient. The delayed sample is generated by the operation of a previously inputted sample.

As the filter length becomes longer in the time domain, a wider range of areas may be controlled (or adjusted) by the filter in the frequency domain. Generally, as the filter length becomes longer, a level of enhancement in the characteristic of out-of-band (OOB) emission in the frequency domain increases.

Figure 7:
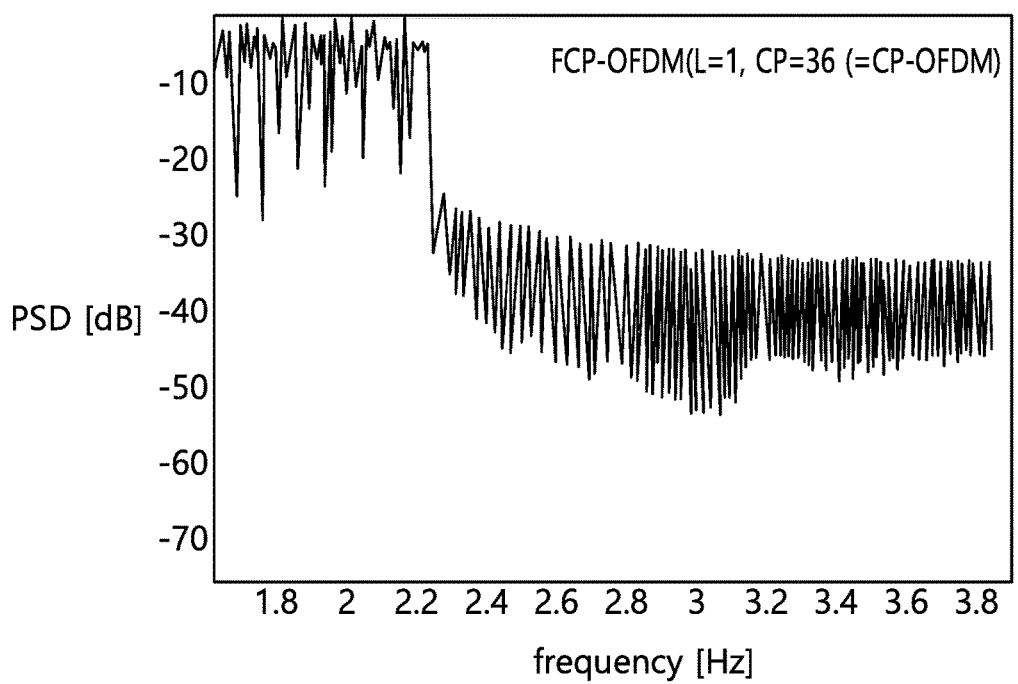
FIG. 7 is a graph showing a power spectrum in a frequency domain of the legacy OFDM.

FIG. 7 is a graph showing a power spectrum in a frequency domain of the legacy OFDM. And, FIG. 8 to FIG. 11 are graphs each showing a power spectrum in a frequency domain of an FCP-OFDM.

FIG. 7 to FIG. 11 each shows a comparison of power spectrums in an actual frequency domain of a legacy OFDM system, wherein CP-OFDM is applied, and a UF-OFDM system, wherein filters are applied in sub-band units.

By adopting filters in sub-band units, the FCP-OFDM system may significantly reduce the influence caused to another neighboring band as compared to the legacy OFDM system. Such characteristic has a significant gain in the aspect of a usage of a fragmented spectrum in a situation where the current frequency resource is exhausted. Additionally, this characteristic also acts a base structure for the next generation technology communication.

Referring to FIG. 7, it can be seen that, in the legacy OFDM, the power level of a signal causing influence on another band gradually decreases. FIG. 7 shows an exemplary case of the legacy OFDM, wherein a length L of the filter is equal to 1, and a duration of the CP is equal to 36.

Conversely, referring to FIG. 8 to FIG. 11, in case of the FCP-OFDM, it can be seen that as the L value becomes larger (or longer) in accordance with the length L of the filter, the power level of a signal causing influence on another band drops at a fast rate. More specifically, due to its characteristic of being capable of reducing influence caused by the signal on another adjacent band, FCP-OFDM is being considered as a candidate for the next generation waveform.

Figure 8:
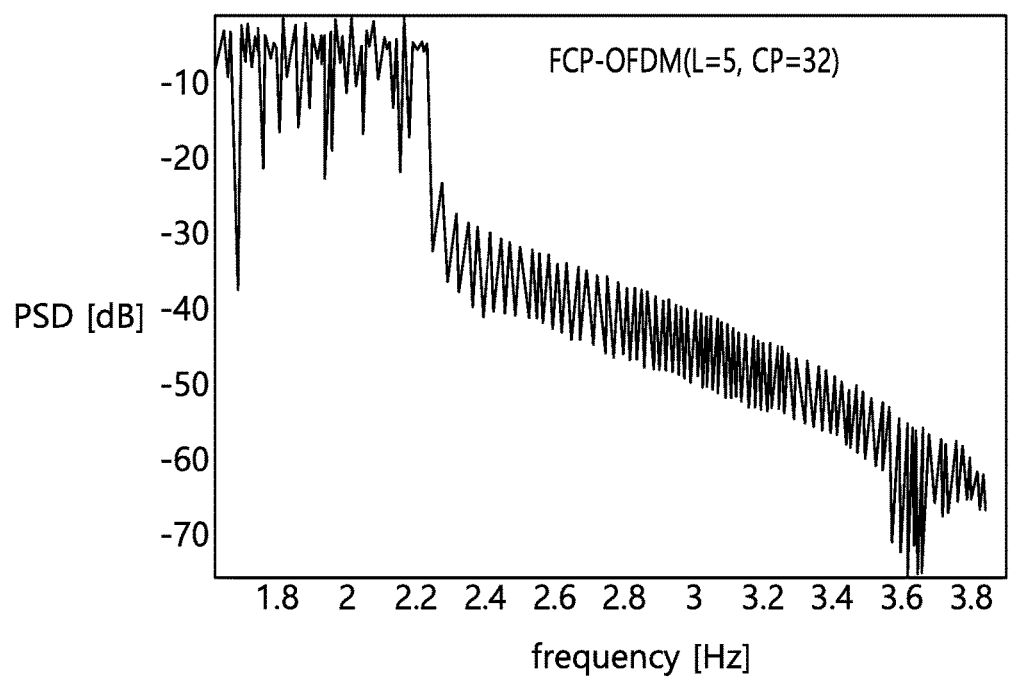
FIG. 8 is a graph showing a power spectrum in a frequency domain of an FCP-OFDM.
Figure 9:
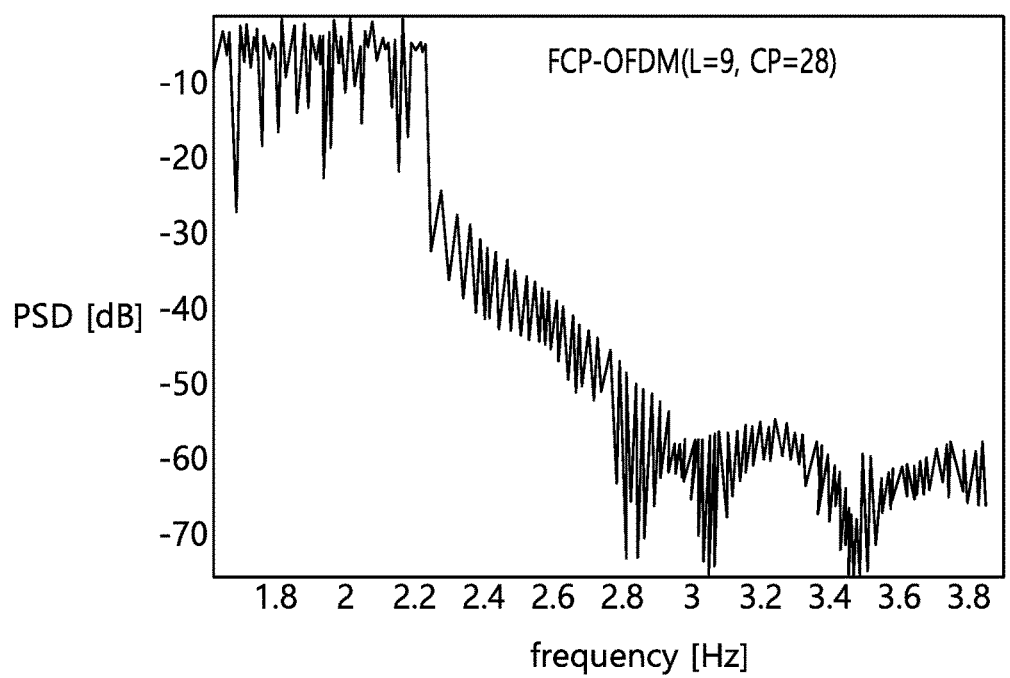
FIG. 9 is a graph showing a power spectrum in a frequency domain of an FCP-OFDM.
Figure 10:
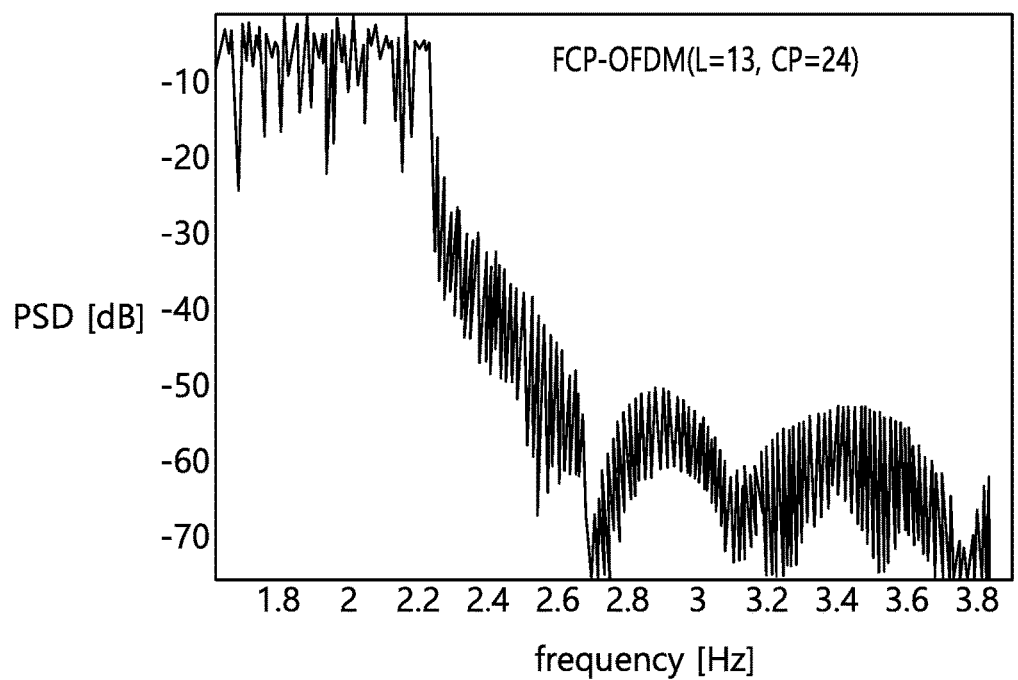
FIG. 10 is a graph showing a power spectrum in a frequency domain of an FCP-OFDM.
Figure 11:
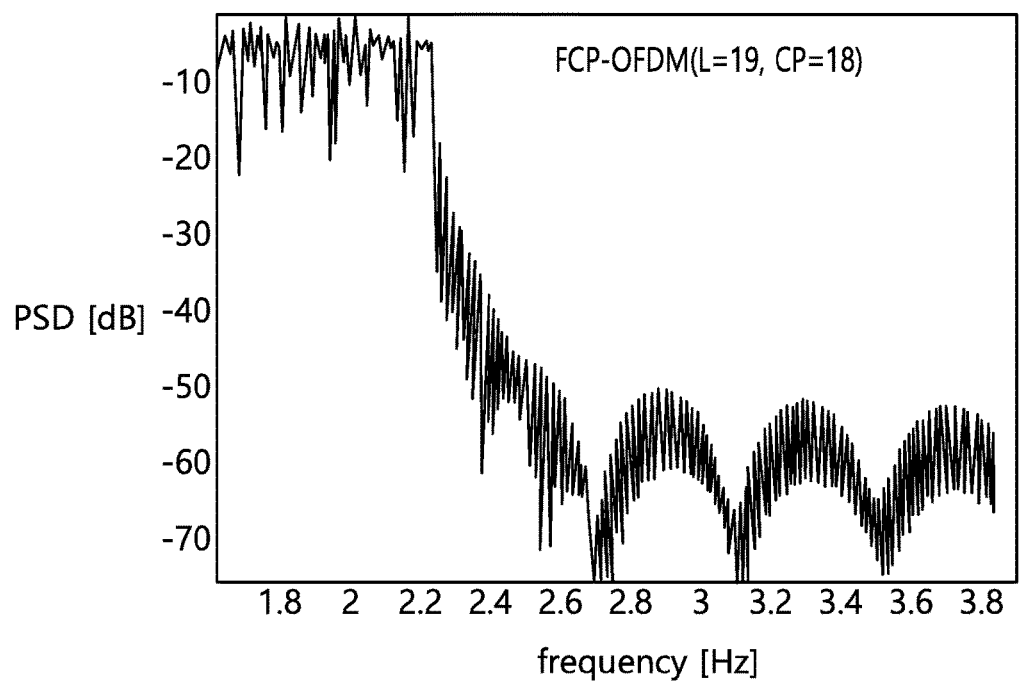
FIG. 11 is a graph showing a power spectrum in a frequency domain of an FCP-OFDM.

In FIG. 8 to FIG. 11, the sum of the filter length L and the CP duration is always maintained at a constant value. This is to maintain frequency efficiency at a constant level even if the length of the filter changes (or varies). FIG. 8 shows a power spectrum of the FCP-OFDM, wherein L=5 and CP duration=32. FIG. 9 shows a power spectrum of the FCP-OFDM, wherein L=9 and CP duration=28. FIG. 10 shows a power spectrum of the FCP-OFDM, wherein L=13 and CP duration=24. FIG. 11 shows a power spectrum of the FCP-OFDM, wherein L=19 and CP duration=18. Herein, the sum of the filter length L and the CP duration is always equal to a constant value of 37. However, the values that are presented above are merely exemplary. And, therefore, the present invention will not be limited only to the values presented in this specification.

The above-described characteristic of the out-of-band emission signal decreasing abruptly results in diverse advantages most particularly in an asynchronous situation. In other words, if orthogonality between two signals within the frequency domain is ensured, synchronization within the time domain is no longer required. Conversely, in case of the legacy OFDM, wherein the out-of-band emission characteristic is unfavorable (or weak), degradation in performance becomes critical when synchronization is no longer maintained.

In case of the Machine Type Communication (MTC), which is frequently mentioned in the current next generation communication system, an overhead that is caused during the synchronization process in the legacy OFDM becomes a critical obstacle in the aspect of energy efficiency. Herein, the synchronization process in the legacy OFDM refers to a series of processes including transmitting, by the user equipment, a random access preamble through a random access channel (RACH), thereby allowing the base station to estimate a transmission timing of the user equipment, and transmitting, by the base station, a timing advance (TA) command allowing the user equipment to control (or adjust) its transmission timing along with a response to the received random access preamble. More specifically, by performing the processes of transmitting a RACH, receiving a TA command, and configuring a connection in accordance with a synchronization, the overhead inevitably becomes larger.

Therefore, in the MTC, the user equipment transmits only a RACH at a consistent cycle, and the base station does not transmit any TA commands. Nevertheless, an asynchronous level is determined through the RACH. A next generation waveform ensuring orthogonality in the frequency domain is being presented as a solution for the transmission and reception of the base station and the user equipment in an asynchronous situation, instead of the legacy OFDM. The FCP-OFDM may also provide gain in the receiving performance in an asynchronous situation by adjusting (or controlling) out-of-band emission patterns in the frequency domain.

As described above, by maintaining a constant sum of the filter length and the CP duration, the FCP-OFDM may consistently maintain frequency efficiency even if the length of the filter changes. Additionally, in order to allow N-point FFT reception to be carried out, the filter length should have a length that is shorter than the CP duration. Under such conditions, by adaptively changing the filter length, performance may be optimized in a situation of multi-user reception.

In case the asynchronous level is low, in other words, in case the reception signals of all user equipments may be within a given (or determined) CP, by minimizing the filter length to 1, an operation identical to that of the waveform of the CP-OFDM may be carried out. Conversely, in case an asynchronous level between the reception signals is high, a method for minimizing interference between the asynchronous reception signals by minimizing the CP duration and by maximizing the filter length is proposed. More specifically, if the asynchronous level is low, since there is initially no need for synchronization in the time domain, there is also no need to perform any process for ensuring orthogonality in the frequency domain, the length of the filter is minimized. Conversely, if the asynchronous level is high, the length of the filter is maximized so that orthogonality can be ensured in the frequency domain, thereby eliminating the need for the synchronization in the time domain.

Hereinafter, a method for adaptively controlling the filter length and the CP duration in accordance with a delay and an asynchronous level caused by the multi-path is proposed.

Figure 12:
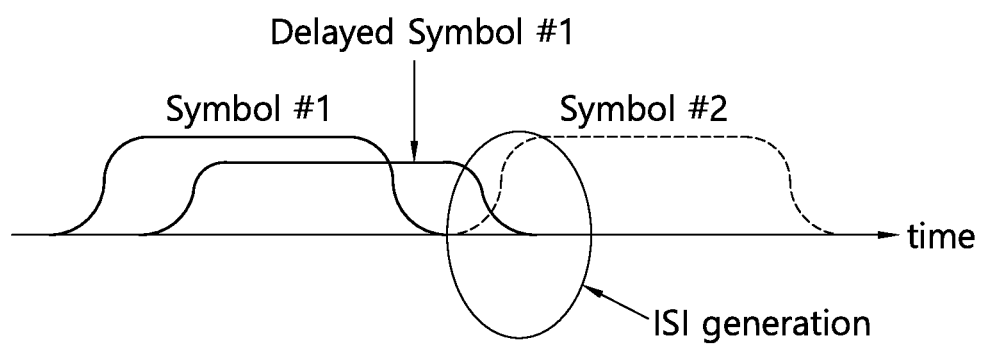
FIG. 12 illustrates an ISI occurring due to latency caused by multi-path.

FIG. 12 illustrates an ISI occurring due to latency caused by multi-path.

The FCP-OFDM system is advantageous in that it can reduce influence of a signal that is caused to another adjacent band. However, in case a delay occurs due to the multi-path, if the filter length is increased and the CP duration is decreased, the FCP-OFDM is also disadvantageous in that is degrades performance due to the delay caused by the multi-path. In other words, the FCP-OFDM system does not have the effect of eliminating (or removing) interference with a previous symbol, i.e., Inter Symbol Interference (ISI) that is generated due to a delay caused by a multi-path as much as the CP duration. As shown in FIG. 12, in the UF-OFDM system, a delay occurs in Symbol #1 due to the multi-path and overlays with Symbol #2. And, herein, if a sufficient CP duration capable of mitigating interference is not ensured, a high level of ISI may occur.

As shown in FIG. 8 to FIG. 11, if the filter length is maximized, the characteristic of out-of-band emission is enhanced, and the interference of signals may be minimized by performing filtering in the receiving device. Additionally, as shown in FIG. 12, when the CP duration is maximized, the ISI that occurs due to a delay caused by the multi-path may be minimized More specifically, since the sum of the filter lengths and the sum of the CP durations are fixed, if one side is increased, another side is decreased. Therefore, the characteristic of out-of-band emission and the characteristic of minimizing interference that occurs due to a delay caused by the multi-path are in a trade-off relationship.

When the asynchronous level is high and an Adjacent Channel Interference (ACI), which is caused by a difference in the reception signals, is large, it is apparent that performance degradation occurs due to the asynchronicity. When the signals of all of the user equipments are more vulnerable to the out-of-band emission signals caused by asynchronicity than to the delay caused by the multi-path, a Bit Error Rate (BER) performance becomes more excellent as the length of the filter becomes longer.

Conversely, there also occurs a case when the interference occurring due to the delay caused by the multi-path caused a greater influence than the asynchronous level. Herein, information that is required for performing a comparison between a BER of the legacy OFDM and a BER of the FCP-OFDM is shown below is Table 1.

TABLE 1

| Parameter | Value |
| --- | --- |
| Bandwidth | 5 MHz |
| FFT Size | 512 |
| Subcarrier Interval | 15 KHz |
| Channel Model | Ped-B/ETU |
| Number of Used Subcarriers | 4 PRBs |
| 1 RB Size | 12 Subcarriers |
| Filter | Dolph-Chebyshev window (37, SLA: 20 dB) |
| Number of Pilot Allocations per RB | 2 (Symbols #4, #11 using Zadoff-Chu Sequence) |
| Channel Estimation Algorithm | LS + linear interpolation (ID) |
| Symbol Timing Offset | Uniform $\epsilon$ (0, $\Delta$STO) |
| Channel Coding | Turbo |

Figure 13:
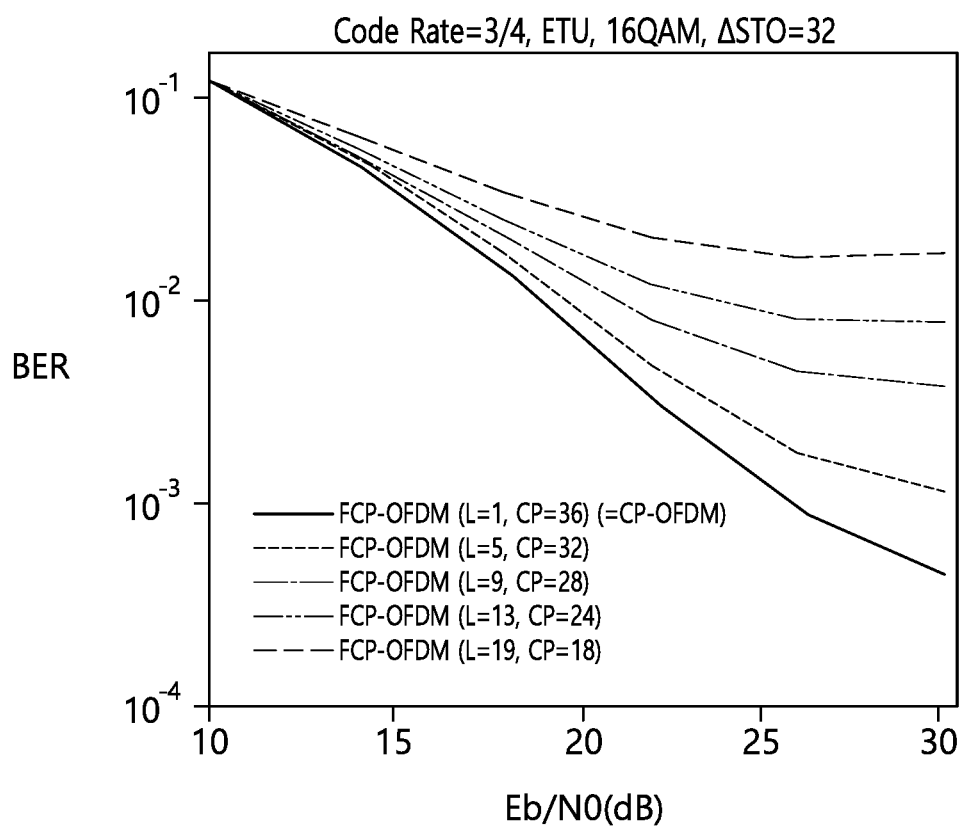
FIG. 13 is a graph showing a comparison of BERs between the legacy OFDM and the FCD-OFDM.

FIG. 13 is a graph showing a comparison of BERs between the legacy OFDM and the FCD-OFDM.

FIG. 13 shows an example of a BER performance according the length of a filter corresponding to an Extended Typical Urban model (ETU) channel environment, wherein a code rate is equal to 3/4, the modulation scheme corresponds to 16QAM, and $\Delta$STO is equal to 32. Herein, the ETU channel corresponds to a channel having a most critical delay caused by the multi-path in a channel environment that is assumed in the current LTE system. In the ETU channel environment, a multi-user (or multi user equipment) signal is more vulnerable to the delay caused by multi-path than an out-of-band emission signal generated by asynchronicity, and, as the CP duration becomes longer, the BER performance becomes more enhanced.

Therefore, by adequately adjusting the filter length and the CP duration of the FCP-OFDM in accordance with the channel environment, modulation, and asynchronous level of multiple user equipments (or multi-users), performance gain best-fitting the corresponding situation may be obtained. Referring to FIG. 13, in an ETU channel, the BER value of the FCP-OFDM, wherein the length of the filter that is identical to the filter used in the operation method of the legacy OFDM is equal to 1, and wherein the CP duration is equal to 36, has a lowest value (i.e., the BER performance is most excellent). However, due to the short filter length, loss in the out-of-band emission characteristic is inevitable. Conversely, a value of the FCP-OFDM having a filter length of 19 and a CP duration of 18 has a highest value (i.e., the BER performance is poorest). However, in this case, gain in the out-of-band emission characteristic may be acquired.

Hereinafter, a method for adaptively adjusting a filter length and a CP duration according to the system environment will be proposed. More specifically, this corresponds to a method of measuring an asynchronous level and adequately adjusting a filter length and a CP duration in accordance with the measured asynchronous level. Operations of the base station and the user equipment (UE) will hereinafter be described in detail.

Figure 14:
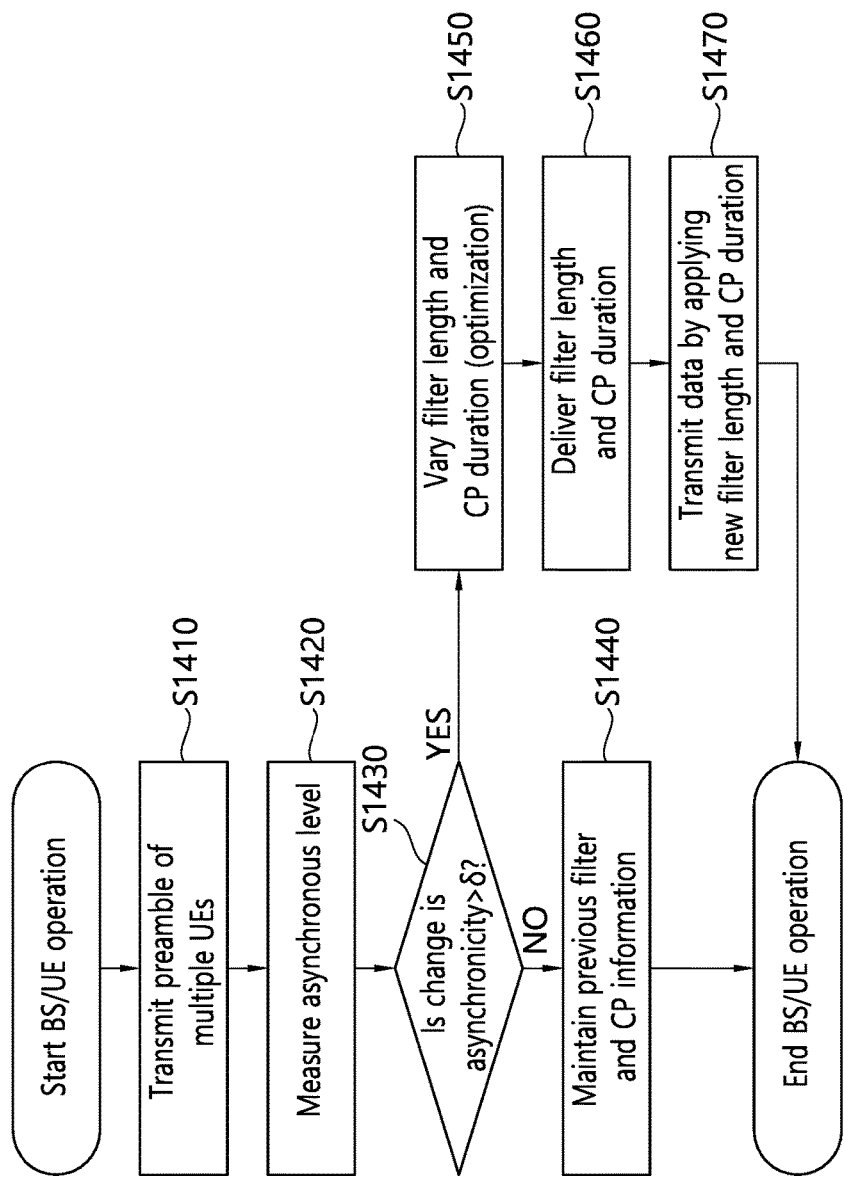
FIG. 14 is a flow chart illustrating a procedure for controlling a filter length in an asynchronous transmission mode according to an exemplary embodiment of this specification.

FIG. 14 is a flow chart illustrating a procedure for controlling a filter length in an asynchronous transmission mode according to an exemplary embodiment of this specification.

Referring to FIG. 14, in step S1410, multiple UEs transmit preambles. After the multiple UEs existing in a cell transmit signals to the base station at the same time, the base station measures a delay length (or level of latency) of the signals that have reached the base station from each UE. Information on when and at which cycle period the preambles are being transmitted is cell-specifically transmitted through system information (Physical Broadcast Channel (PBCH)). Additionally, such information may be configured through a physical layer signal or higher layer signal either UE-specifically or in UE group units. The preamble transmission may also use a Random Access Channel (RACH) or a Sounding Reference Signal (SRS) of the legacy LTE system. Since all of the multi UEs support the asynchronous transmission mode, the UE does not receive timing advance (TA) information, which is associated with time-based synchronization with the base station, from the base station, and the UE perform random access to the base station through a RACH. Accordingly, since a synchronization procedure is not separately performed, overhead caused by the synchronization process may be reduced. The TA information is determined based on a delay length (or level of latency) of a signal received from the UE.

In step S1420, an asynchronous level is measured by analyzing a time difference based on a signal that is actually received from the user equipment. Herein, the value of the measured asynchronous level may be equal to a value corresponding to a maximum value of the time difference between the received signals, and a distribution range may also be used based on an average value.

In step S1430, a level of variation (or change) in the asynchronicity is determined. Based on the measured value of the asynchronous level, which is acquired in step S1420, it is determined whether or not a difference in the asynchronous level in comparison with a previously measured asynchronous level exceeds a pre-defined threshold value. For example, if a difference between the asynchronous level and the previous value is equal to 6 or more, it may be determined that the difference in the asynchronous level exceeds the threshold value. Herein, the threshold value may pre-defined in advance through a performance simulation that is performed off-line, and, then, the simulation results may be stored in a table and then used. Furthermore, the threshold value may also be predetermined by the base station.

In step S1440, in case a value of the measured asynchronous level does not exceed a pre-defined threshold value, the previously used filter length is maintained without any variation. If the filter length is maintained, the CP duration shall also be maintained. This is because the sum of the filter length and the CP duration is always maintained at a constant value. More specifically, an overhead for the usage of the filter and the CP may be set to a fixed value.

In step S1450, in case a value of the measured asynchronous level exceeds a pre-defined threshold value, depending upon whether the measured asynchronous level has increased or decreased, the filter length is changed (or varied) to an adequate filter length indicated in the table, which was pre-defined in advance off-line. If the filter length is determined, the CP duration shall also be determined. This is because the sum of the filter length and the CP duration is always maintained at a constant value. If the asynchronous level exceeds the threshold value, this indicates that the asynchronous level has increased and that degradation in the performance may occur due to the asynchronicity. Therefore, the filter length shall be longer than the previously used filter. As the filter length becomes longer in the time domain, a wider range of areas may be controlled (or adjusted) by the filter in the frequency domain. Thus, a level of enhancement in the characteristic of out-of-band (OOB) emission in the frequency domain increases. The CP duration is shorter than the length of an OFDM symbol or the length of an SC-OFDMA symbol. The CP having the CP duration is positioned between OFDM symbols or between SC-FDMA symbols and performs the role of preventing interference from occurring due to the delay caused by the multi-path. Since the CP duration eventually decreases, the gain acquired by preventing interference from occurring due to the delay caused by the multi-path may also decrease accordingly.

In step S1460, in case the base station cell-specifically transmits a value of the filter length, which is determined in step S1450, the base station delivers the filter length and the CP duration that are determined through the system information (PBCH) as the control information. In case the base station UE-specifically transmits or transmits in UE group units a value of the filter length, which is determined in step S1450, the base station delivers the filter length and the CP duration that are determined through a physical layer signal (PDCCH, and so on) or a higher layer signal as the control information.

In step S1470, the user equipment, which has received information on the new filter length and information on the new CP duration, performs data transmission by applying the new filter length and CP duration.

Figure 15:
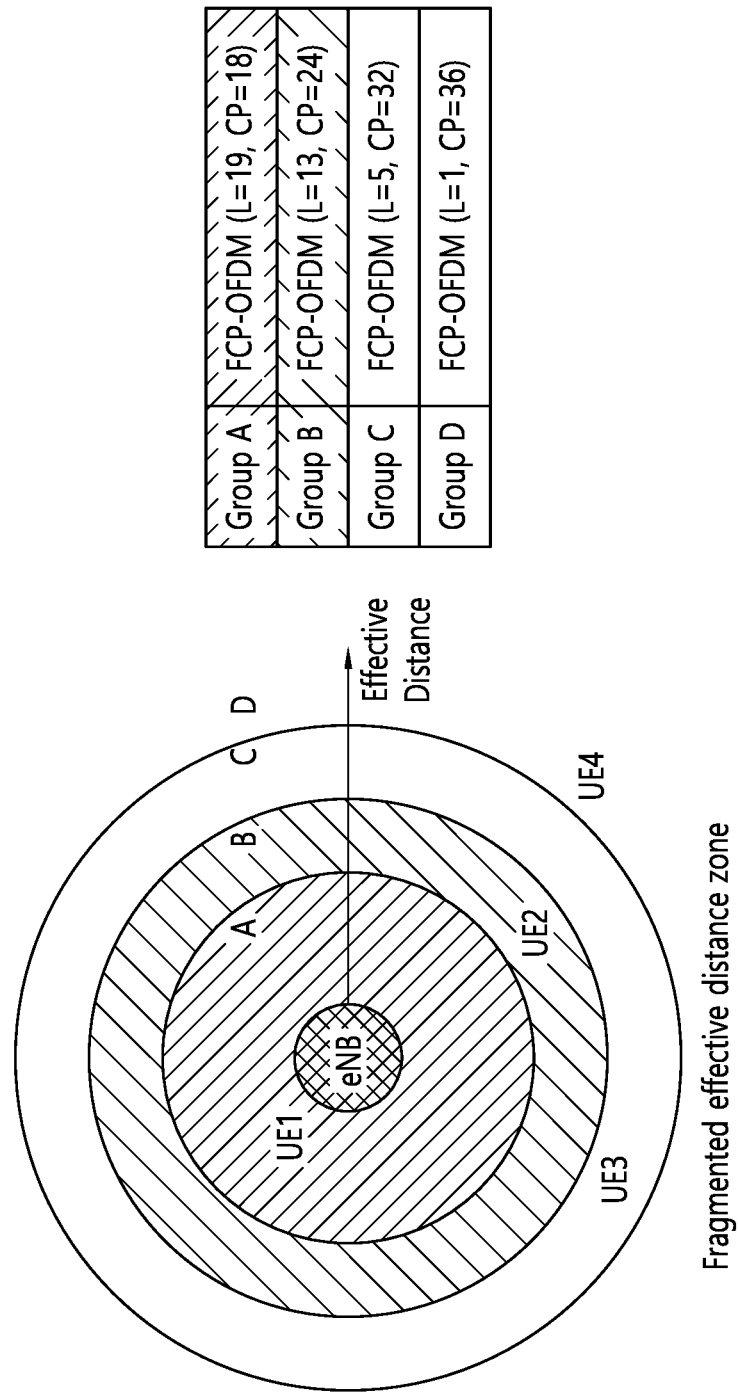
FIG. 15 illustrates an example of adaptively using a filter length through user equipment grouping.

FIG. 15 illustrates an example of adaptively using a filter length through user equipment grouping.

FIG. 15 shows an example of using UE-grouping and an adaptive filter length according to an effective distance zone in a viewpoint of a cellular system. Herein, UE1 is located at a position relatively closer to the base station (eNB). And, as compared to a user equipment (UE) that is positioned further away to a peripheral area, a more advantageous channel environment and a shorter delay caused by the multi-path may be expected from UE1. Therefore, a method of reducing out-of-band emission for minimizing signal interference from the UE, which is positioned further away to a peripheral area, is used by using a relatively shorter CP duration and a relatively longer filter length.

Conversely, UE4 is located at a position relatively further away from the base station (eNB). And, as compared to a user equipment (UE) that is positioned at the center of the cell, a more disadvantageous channel environment and a longer delay caused by the multi-path may be expected from UE4. Therefore, a method of increasing its own signal coding rate is used by using a relatively longer CP duration and a relatively shorter filter length, as in group D. A method of adaptively using the grouping of UEs and the filter length may be diversely determined in accordance with the system environment. And, the corresponding processing procedure follows the procedure described in FIG. 14.

Additionally, UE2, which is positioned at a center of its distance from the base station (eNB), uses a CP duration and a filter length of group B, and UE3 uses a CP duration and a filter length of group C.

Although the specification of the present invention proposes a method of transmitting, by the base station, control information used by the user equipment (or terminal), the present invention will not be limited only to this. Accordingly, the present invention may also be applied to an environment, wherein multiple transmitting devices transmit signals to one receiving device.

Figure 16:
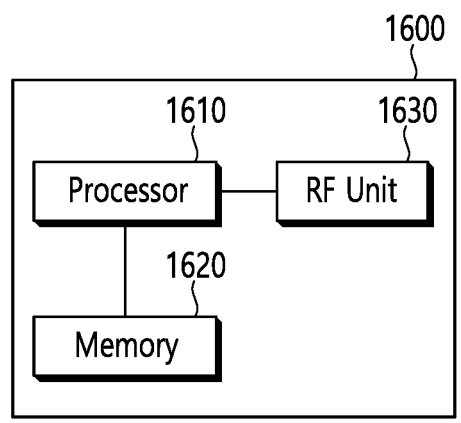
FIG. 16 is a block diagram showing an apparatus for wireless communication for implementing an embodiment of the present invention.

FIG. 16 is a block diagram showing a device for wireless communication for implementing an embodiment of the present invention.

The device 1600 for wireless communication includes a processor 1610, a memory 1620 and a radio frequency (RF) unit 1630.

The processor 1610 may be configured to implement proposed functions, procedures and/or methods described in this description. Layers of the radio interface protocol may be implemented in the processor 1610. The processor 1610 may handle a procedure explained above. The memory 1620 is operatively coupled with the processor 1610, and the RF unit 1630 is operatively coupled with the processor 1610.

The processor 1610 may include application-specific integrated circuit (ASIC), other chipset, logic circuit and/or data processing device. The memory 1620 may include read-only memory (ROM), random access memory (RAM), flash memory, memory card, storage medium and/or other storage device. The RF unit 1630 may include baseband circuitry to process radio frequency signals. When the embodiments are implemented in software, the techniques described herein can be implemented with modules (e.g., procedures, functions, and so on) that perform the functions described herein. The modules can be stored in memory 1620 and executed by processor 1610. The memory 1620 can be implemented within the processor 1610 or external to the processor 1610 in which case those can be communicatively coupled to the processor 1610 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method for transmitting, by a base station, control information used in a user equipment, comprising:
   measuring an asynchronous level of a user equipment supporting an asynchronous transmission mode by using a signal received from the user equipment;
   determining whether or not the measured value of the asynchronous level exceeds a threshold value;
   in case the measured value of the asynchronous level exceeds the threshold value, varying a filter length and a cyclic prefix (CP) length being used by the user equipment;
   transmitting information on the varied filter length and CP duration to the user equipment; and
   wherein a sum of the filter length and the CP duration corresponds to a fixed value.

2. The method of claim 1, wherein, in case the user equipment supports the asynchronous transmission mode, the user equipment performs random access to the base station instead of receiving timing advance (TA) information being related to its time-based synchronization with the base station.

3. The method of claim 2, wherein the TA information is determined based on a delay length (or level of latency) of the signal received from the user equipment.

4. The method of claim 1, wherein the user equipment comprises:
a CP inserting unit being connected to an IDFT block performing IDFT in frequency resource block units, and
a filter being connected to the CP inserting unit.

5. The method of claim 1, wherein the CP duration is shorter than a length of an Orthogonal Frequency Division Multiplexing (OFDM) symbol or a Single-Carrier Frequency Division Multiplexing (SC-FDMA) symbol, and
wherein the CP having the corresponding CP duration is positioned in-between the OFDM symbols or the SC-FDMA symbols.

6. The method of claim 1, wherein, in case the measured value of the asynchronous level does not exceed the threshold value, the filter length and the CP duration being used by the user equipment are maintained without modification.

7. The method of claim 1, wherein the threshold value is pre-designated by the base station.

8. The method of claim 1, wherein the measured value of the asynchronous level is indicated as a maximum difference value between reception points of signals received from the user equipment.

9. The method of claim 1, wherein the signal received from the user equipment is received through a Physical Random Access Channel (PRACH) or a Sounding Reference Signal (SRS).

10. The method of claim 1, wherein the information on the varied filter length and CP duration is received through a Physical Broadcast Channel (PBCH), a physical layer signal, or a higher layer signal.

11. A wireless device transmitting control information used in a user equipment, comprising:
radio frequency (RF) unit transmitting and receiving radio signals; and
a processor being operatively connected to the RF unit;
wherein the processor is configured:
to measure an asynchronous level of a user equipment supporting an asynchronous transmission mode by using a signal received from the user equipment,
to determine whether or not the measured value of the asynchronous level exceeds a threshold value,
in case the measured value of the asynchronous level exceeds the threshold value, to vary a filter length and a cyclic prefix (CP) length being used by the user equipment, and
to transmit information on the varied filter length and CP duration to the user equipment; and
wherein a sum of the filter length and CP duration corresponds to a fixed value.

* * * * *